Figure 1:
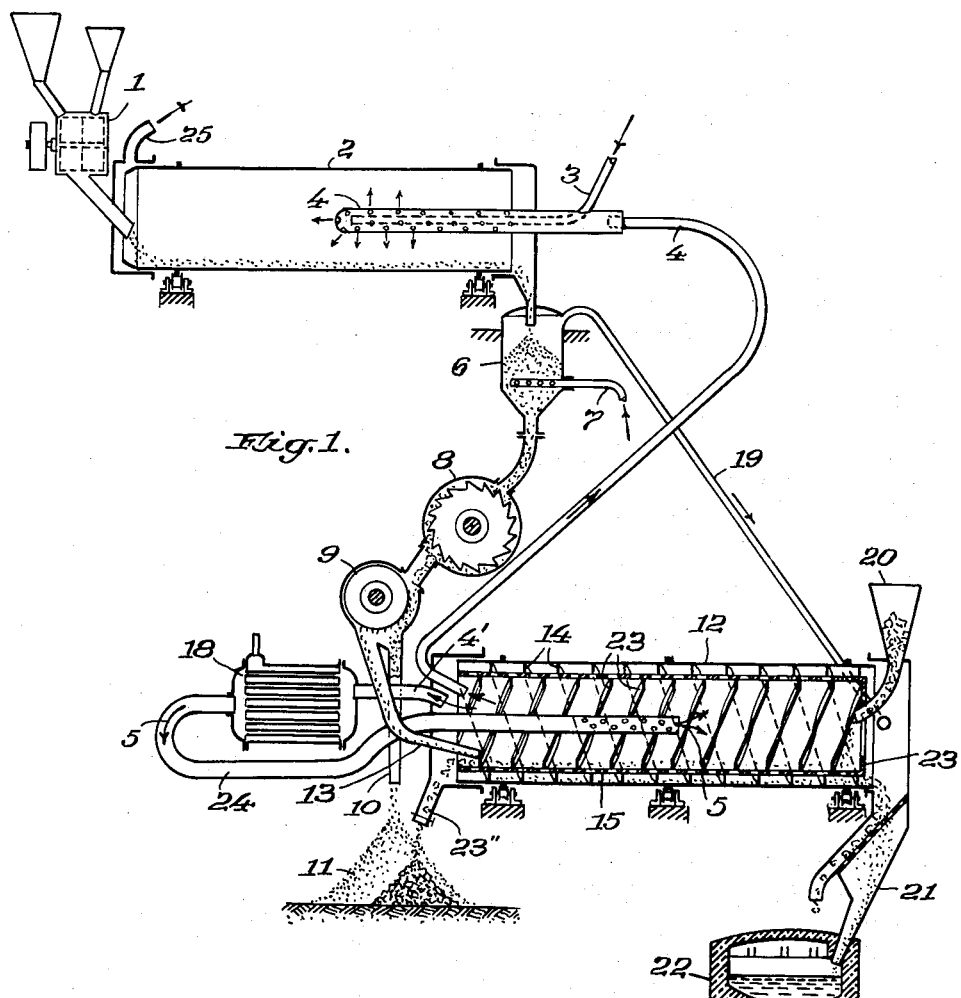

May 29, 1956 K. VON HAKEN 2,747,988
METHOD FOR THE RECOVERY OF PURE IRON
OXIDE AND IRON FROM OXIDIC IRON ORES
Filed April 16, 1952 2 Sheets-Sheet 1

INVENTOR.
KURD VON HAKEN
BY
ATTORNEY

May 29, 1956 K. VON HAKEN 2,747,988
METHOD FOR THE RECOVERY OF PURE IRON
OXIDE AND IRON FROM OXIDIC IRON ORES
Filed April 16, 1952 2 Sheets-Sheet 2
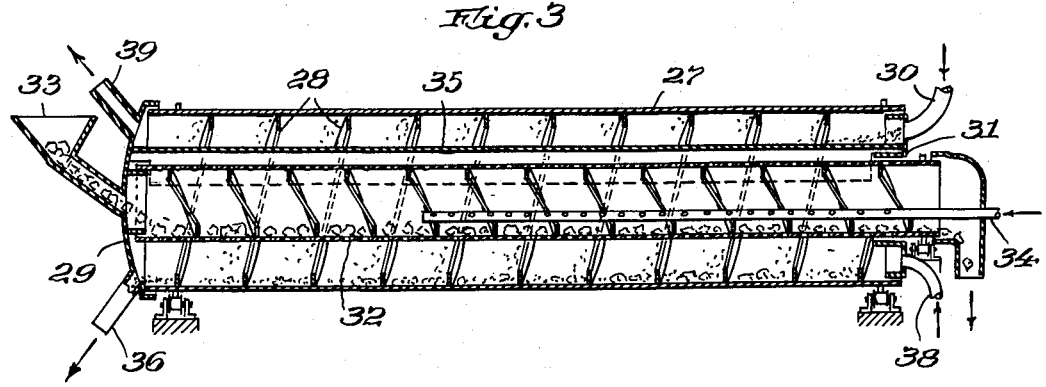
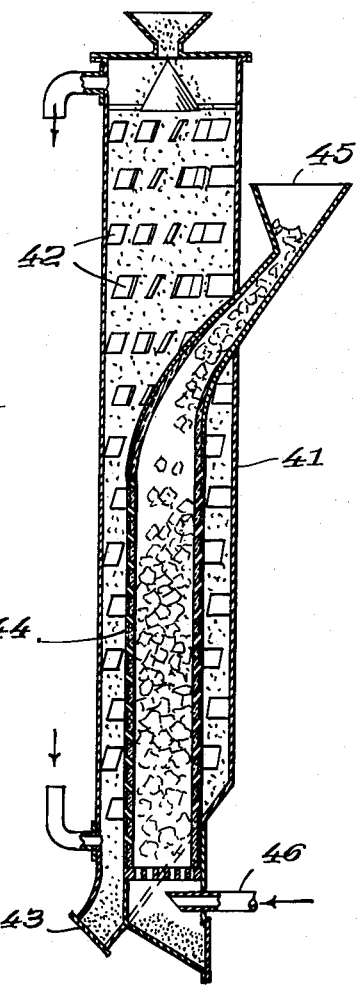
INVENTOR.
KURD VON HAKEN
BY E J Freeman
ATTORNEY

United States Patent Office 2,747,988
Patented May 29, 1956

2,747,988

METHOD FOR THE RECOVERY OF PURE IRON OXIDE AND IRON FROM OXIDIC IRON ORES

Kurd von Haken, Murnau, Germany, assignor of one-third to Kenneth R. Marsden, Chicago, Ill.

Application April 16, 1952, Serial No. 282,561

Claims priority, application Germany April 23, 1951

5 Claims. (Cl. 75—33)

The invention relates to a method for the recovery of pure iron oxide and iron from oxidic iron ores and particularly from poor iron ores.

It is an object of the invention to enable a practically complete separation of the iron oxides from the gangue, and to achieve this aim under economically satisfactory conditions, this being an important requisite for the production of a pure iron.

It is a further object of the invention to eliminate the heat-economically highly undesirable presence of the gangue in the last stages of the iron recovery.

It is also an important object of the invention to perform the final reduction of the separated iron oxides to iron at a possibly low temperature and to prevent a fritting together of the same into coarse bodies.

It is a further object of the invention to prevent incomplete reduction of the iron ore and to shorten the time of its reduction.

In compliance with these objects the comminuted iron ore is subjected to preliminary reduction, thereupon partly reoxidized at a temperature below 500° C. to magnetic $\gamma$-$Fe_2O_3$ and the latter is separated from the gangue by magnetic action and reduced to iron. The reoxidation is effected with steam at a temperature of between about 270 to 400° C. In this manner, overheating is avoided which already at a temperature of 600° C. may lead to sintering causing the creation of highly stable non-magnetic iron compounds, which could only be treated for the recovery of iron by melting in a shaft furnace. Moreover, and due to the heat-decomposition of the steam, hydrogen is liberated which may be used for the reduction of the pure iron oxide resulting from the magnetic separation.

The ore which upon its preliminary reduction, intermediate reoxidation and further reduction contains the iron as $\gamma$-$Fe_2O_3$ is finely comminuted, the grinding being facilitated by the increase of the crystal size caused by the conversion of the FeO and $Fe_2O_3$ into $\gamma$-$Fe_3O_4$ which produces a surprisingly energetic demolition of the ore combine.

The final reduction of the thus produced finely divided $\gamma$-$Fe_2O_3$ may be effected in the presence of coal at the low temperature of between 720–800° C., whereby the formed CO is converted with the oxygen of the $Fe_2O_3$ to $CO_2$ and the reduction is completed by the hydrogen formed during the production of the $\gamma$-$Fe_2O_3$.

In order to produce an iron which is free of phosphorus and sulfur, the fine coke used for the reduction of the iron oxide may be coated with cement. These coatings not only prevent at the temperatures beneath 1000° C., the transition from the P and S from the coke into the iron, but they also impart to the coke a good mechanical resistance which enables its countercurrent movement relative to the fine iron oxides, if both materials are kept separated by a sieve of a mesh size through which the iron oxides, but not the coke, may easily pass.

The flue gases from the reduction of the iron oxide consisting mainly of CO and $CO_2$ are freed from $CO_2$ and returned into the reduction process; they may also be used for the preheating and for the preliminary reduction of the iron ore. This is particularly recommendable, if sintering of the fine materials occurs at a temperature beneath the reduction temperature; otherwise, a high percentage of the iron oxide will be lost with the gangue.

If, however, iron ores are treated where the reduction to iron takes place at a low temperature, eventually upon the admixture of catalytic substances, or if accessory ore components such as manganese or phosphorus are to be recovered, the reduction of the comminuted ore is to be continued up to the recovery of manganese and phosphorus, eventually with an admixture of suitable materials.

In order to obtain a complete separation of the iron oxide from the gangue, complete formation of $\gamma$-$Fe_2O_3$ should be established, in conformity with the invention, prior to its final reduction for the purpose to loosen the ore combine by the inherent increase of the crystal size.

It is recommended to continue the comminution or grinding until a fine powder is obtained. If this rule is not observed, and a grain size results of, for instance, 5 to 10 millimeters, the reduction of the ore will require an astonishingly large time; still, a considerable portion of the ore will not be reduced or will stick to the gangue and resist the magnetic separation which must be repeated accordingly at a temperature of 450° C., the first reduction with C in the form of coal or gas being attained spontaneously.

In order to recover manganese, iron and dolomite dust may be added to the gangue after the separation of the iron oxide and the mixture treated in a shaft furnace at a high temperature to produce ferro-manganese. The advantage results over the customary high furnace production of iron, in the high furnace, that the iron is recovered in a pure state, has a desired percentage of carbon and the formation of graphite is avoided.

For the recovery of phosphorus the gangue should be mixed with iron dust and treated in a shaft furnace to produce ferrophosphide.

The fine iron dust produced by the invention may be agglomerated.

The separation is preferably carried out at a temperature of about 100° C. in a reducing atmosphere and the iron dust should be heated to about 800° C. to make it resistant to the oxygen of the air; it may be agglomerated at the same time or pressed into sintered bodies; alloying metals, for instance copper or substances which promote sintering, may be added.

For the preliminary reduction of 1000 kilograms of the ore, about 120 kilograms carbon present in the form of coke are employed; due to the required double reduction, the consumption ascends to 135 kilograms.

Accordingly, the following caloric table results of a 25 per cent Fe containing ore when processed in conformity with the invention.

[Thermal units are abbreviated as Th. U.]

| | | |
|---|---|---|
| (1) Heating of 4 tons of the ore inclusive side reactions to about 480° C ............Th. U.. | 450,000 | .............. |
| (2) Preliminary reduction to improve $Fe_3O_4$ ............Th. U.. | 50,000 | .............. |
| (3) Final reduction of 1.4 tons to $FeO_3$ and of 0.14 tons of C ............Th. U.. | 220,000 | .............. |
| (4) Oxidation to $Fe_2O_3$ ............Th. U.. | .............. | −50,000 |
| (5) Heating of the $Fe_2O_3$ and preliminary reduction in the second furnace ......Th. U.. | 120,000 | .............. |
| (6) Total heat liberated from carbon..Th. U.. | .............. | −1,100,000 |
| (7) Coloric value of the flue gases......Th. U.. | .............. | −200,000 |
| Total Th. U ........................... | 840,000 | −1,350,000 |

Figure 2:
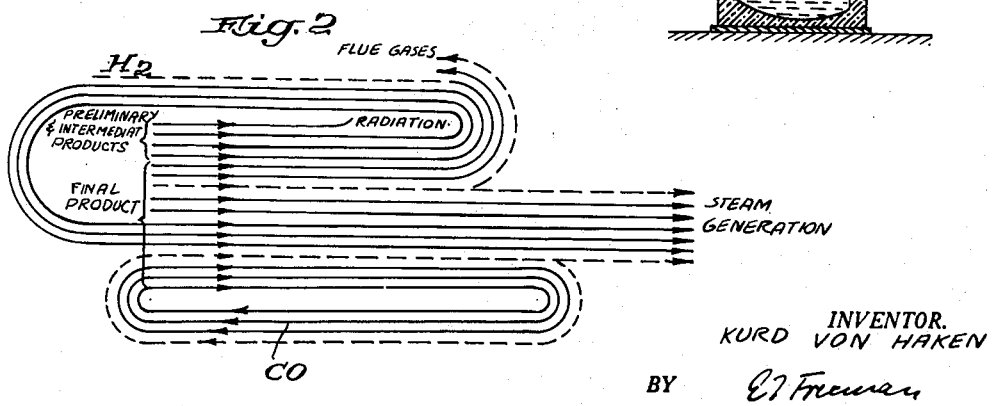

Several modifications of the invention will now be described in the following examples and with reference to the attached drawings, of which Figs. 1, 3, 4 show several furnace combinations; and Fig. 2 illustrates the caloric conditions in the same.

Example 1

Soft oxidic iron ore and a cheap fuel or coal are charged in the crusher 1 and milled to about 1 millimeter size. This mixture is charged into the rotary furnace 2 and heated by a reducing gas, such as CO, H or carbohydrates introduced through tube 4, to about 480° C. In the rear portion of the furnace, air is introduced from tube 3 to oxidize the preliminary reduced ore.

In this manner, the ore is first reduced upon its entry into the furnace, hereupon more or less reoxidized by the air entered from tube 3 and hereafter again and finally reduced by the gas entering from the rear portion of tube 4. In this manner, zones of preliminary reduction, oxidation and final reduction are created in the furnace 2, through which the entered ore is successively passed.

Hereupon, the reduced ore is conducted from furnace 2 into the container 6; here it is countercurrently subjected to the action of hot steam entered from tube 7 and exidized to $\gamma-Fe_2O_3$. It is now passed into a mill 8 where it is ground.

By the stepwise chemical treatment in the rotary furnace 2, the ore has been softened with the eventual exception of a few lumps which are preferably separated.

The finely divided ore is now conducted into magnetic separator 9. The gangue is discharged through tube 10 onto a dump 11; the iron oxide is conducted through tube 13 into a second rotary or drum furnace 12 for its conversion into metal.

In this furnace 12, which as shown in Fig. 1, may be horizontal, or may be vertical, the fine iron oxide is by helical conveyor 14 transported along the inner wall and kept apart from the center space of the furnace by a coarse screen 15; coke preferably coated with concrete is entered from funnel 20 and passed by means of a helical conveyor 23 through the inner furnace space. The helical conveyor 23 is provided with an extension 23' to prevent the entrance of the coke into the outer drum space.

The reaction gases are discharged through conducts 4 and 4' The gas leaving through tube 4' heats the boiler 18 and is partly regenerated by removal of the carbonic acid. The CO enriched comparatively cold gases 5 return through tube 34 into the furnace and are distributed in the same to eliminate local overheating.

The hydrogen produced in container 6 by reaction of the steam with the reduced ore is conducted through tube 19 into the discharge end of furnace 12.

The coke, which is continuously conducted from container 20 into the furnace 12 has a grain size of more than 10 millimeters in order to prevent its passage through the openings of the screen 15, whereas the fine iron oxide or iron dust may freely pass through the same.

The iron powder or dust is discharged through passage 21 and is directly conducted into the melting furnace 22, for instance, a Martin or an electric furnace and melted in the same.

The exhaust gases having a temperature of about 240° C. leaving the furnace 12 through tube 4 are conducted into the preliminary reduction furnace 2 and leave the same through tube 25. The temperature loss at this place is about 20° C.

A further embodiment of the invention is illustrated in Figs. 3 and 4 and described, as follows.

Example 2

As apparent from Fig. 3, a perforated center tube 32 is rotatably located in a rotary drum furnace composed of outer tube 27 and lateral covers 29, 31. The furnace is provided with blades 28 for the transport of the ore charged from tube 30.

The furnace, including casing 27 and the tube 32, is rotatable about its horizontal axis. The rotational speed of casing 27 is so controlled that the ore dust entered through tube 33 is carried along by the blades 28, falls down upon reaching its maximum height but by the protective shield 35 is prevented from passing into the inner tube 32; the latter might be heated with generator gas; however, it is preferable that the slowly rotating inner tube 32 is charged with small coal particles or coal dust from charging funnel 33. The coal particles may be covered with a lime or concrete coating to prevent the escape of sulfur or phosphorus; the formed generator gas diffuses in the form of CO into the drum 27, whereas the $CO_2$ flows back into the surrounding space.

The required temperature is maintained by an excess of air introduced through tube 34, which is distributed in the surrounding generator space; the temperature required in the rotatable furnace for the iron oxide reduction or the preliminary step thereof is maintained by cooling the furnace wall or by the application of special gas conduits. Eventually, steam may be blown through tube 38 into the inner tube. The excess gases are discharged through tubes 39 located between cover 29 and furnace casing 27 for any suitable utilization.

A further embodiment of the invention is illustrated by Fig. 4 and described as follows.

Example 3

The here shown vertical drum furnace 41 is provided at its inner circumference or casing with a series of adjustable inclined superposed adjacent plates 42. The ore to be treated falls from above upon these inclined plates and slides with a continuously reduced speed from one to the other through the furnace until it reaches the discharge tube 43. A downwardly widening tube 44 is provided in the center of the furnace.

The tube is coated with lime and comminuted coke is entered into the tube from tube 45. Air and eventually water is entered into the tube from below through tube 46.

In the heated tube, a generator gas is produced consisting of CO and $H_2$ which acts reducingly upon the coal dust in tube 41.

The temperature in the furnace varies between 500° in the upper to 1000° C. in the lower portion. The hot iron oxide dust is conducted in the lower portion of the furnace.

The inclined plates 24 may be replaced by gas cooled openings, which retard the falling ore or iron oxide dust for a time to effect a sufficiently long exposure to the reducing gases. The same furnace may be used for a consecutive reduction of the iron oxide to iron.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows.

1. In a method for the production of pure iron from poor iron ores including the reduction of the ore to $Fe_3O_4$ and a consecutive oxidation of the same in the presence of steam to gamma $Fe_2O_3$ at a temperature beneath 400° C. the step of grinding and magnetic separating gamma $Fe_2O_3$ from the gangue and of reducing the separated $Fe_2O_3$ at a temperature of 420 to 860° C.

2. In a method according to claim 1, the step of using a reducing substance selected from the group consisting of finely disintegrated coal.

3. In a method according to claim 1, reduction of gamma $Fe_2O_3$ with coal in the presence of lime powder for binding phosphorus.

4. In a method according to claim 1, the use of fine iron dust as a reduction accelerator.

5. In a method according to claim 1, the step of reducing the gamma $Fe_2O_3$ in a carbon monoxide containing atmosphere.

(References on following page)

References Cited in the file of this patent

UNITED STATES PATENTS

| | | |
|---|---|---|
| 126,924 | Blair | May 21, 1872 |
| 290,215 | Cherry | Dec. 18, 1883 |
| 1,053,435 | Rendall | Feb. 18, 1913 |
| 1,061,950 | Simpson | May 13, 1913 |
| 1,940,246 | Clark et al. | Dec. 19, 1933 |
| 2,074,013 | Bradley | Mar. 16, 1937 |
| 2,282,124 | Fahrenwald | May 5, 1942 |
| 2,320,206 | Engel et al. | May 25, 1943 |

FOREIGN PATENTS

| | | |
|---|---|---|
| 52,877 | Norway | July 31, 1933 |
| 896,834 | France | Mar. 5, 1945 |